(12) United States Patent
Raaf

(10) Patent No.: US 7,095,730 B1
(45) Date of Patent: Aug. 22, 2006

(54) DATA TRANSMISSION WITH INTERRUPTION PHASES

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 860 days.

(21) Appl. No.: 09/699,835

(22) Filed: Oct. 30, 2000

Related U.S. Application Data

(63) Continuation of application No. PCT/DE98/01870, filed on Jul. 7, 1998.

(60) Provisional application No. 60/083,099, filed on Apr. 28, 1998.

(30) Foreign Application Priority Data

Apr. 28, 1998 (DE) .............................. 198 18 984

(51) Int. Cl.
*H04B 7/216* (2006.01)
*H04J 3/24* (2006.01)
*H04L 25/38* (2006.01)

(52) U.S. Cl. .................. 370/342; 370/473; 370/474; 375/370

(58) Field of Classification Search ............... 370/320, 370/335–346, 441, 206–209, 465, 347, 470–474, 370/395, 331, 311, 509–510, 305, 365–367, 370/389, 350; 375/145–150, 376, 130, 368, 375/141, 370, 357–367, 466, 329, 134, 133, 375/136, 326, 202; 455/12.1, 436, 451, 517, 455/522, 63.1, 295, 296; 703/25–27; 714/704
See application file for complete search history.

(56) References Cited

U.S. PATENT DOCUMENTS 4,569,062 A * 2/1986 Dellande et al. ............ 370/305
5,195,092 A * 3/1993 Wilson et al. ............... 370/528
5,459,731 A * 10/1995 Brief et al. .................. 714/704
5,483,532 A * 1/1996 Eriksson ...................... 370/528
5,535,373 A * 7/1996 Olnowich ..................... 370/466
5,959,795 A * 9/1999 Wu .............................. 360/27
6,154,652 A * 11/2000 Park et al. ................... 370/528
6,157,674 A * 12/2000 Oda et al. .................... 370/528

FOREIGN PATENT DOCUMENTS

GB    2 297 460 A    9/1996

OTHER PUBLICATIONS

Published International Application No. WO 94/29981 (Grimlund et al.), dated Dec. 22, 1994.
Published International Application No. WO 97/25827 (Menzel), dated Jul. 17, 1997.
Japanese Patent Abstract No. 62047236.(Toshihide), dated Feb. 18, 1987.
* cited by examiner

*Primary Examiner*—Chi Pham
*Assistant Examiner*—Prenell Jones
(74) *Attorney, Agent, or Firm*—Laurence A. Greenberg; Werner H. Stemer; Ralph e. Locher

(57) ABSTRACT

The invention relates to a method for data transmission in a communication system, especially in a CDMA mobile radio system, wherein the data are transmitted structured into frames (1, 4, 5) and a transmitting station transmits the data in such a manner that a receiving station receiving the data is able to perform other functions, especially carrying out measurements via a receiving device, during one or more interruption phases (2) in which it interrupts the reception and/or the processing of received data. It is the object of the invention to allow interruption phases (2) whilst maintaining as good a quality of the data transmission as possible. For this purpose, it is proposed that an individual continuous interruption phase (2) extends over at least sectional-portions of at least two successive frames (4, 5).

19 Claims, 1 Drawing Sheet

DATA TRANSMISSION WITH INTERRUPTION PHASES

CROSS-REFERENCE TO RELATED APPLICATION

This is a continuation of copending international application PCT/DE98/01870, filed Jul. 7, 1998, which designated the United States. This application also claims the benefit under 35 U.S.C. § 119(e) of provisional application No. 60/083,099, filed Apr. 28, 1998.

BACKGROUND OF THE INVENTION

Field of the Invention

The invention relates to a method for data transmission in a communication system, especially in a CDMA mobile radio system, wherein the data are transmitted structured in frames and a transmitting station transmits the data in such a manner that a receiving station receiving the data is able to perform other functions, especially carrying out measurements via a receiving device, during one or more interruption phases in which it interrupts the reception and/or the processing of received data. The invention also relates to the use of a transmitting station, especially the base station of a mobile radio network, and the use of a receiving station, especially the mobile station of a mobile radio network, for carrying out such a method.

In communications systems, data (for example voice data, image data or system data) are transmitted on transmission links between transmitting stations and receiving stations. In the case of radio communication systems this is done with the aid of electromagnetic waves via an air or radio interface. In this arrangement, carrier frequencies are used which lie in the frequency band intended for the respective system. In the case of GSM (Global System for Mobile Communication), the carrier frequencies lie within the 900 MHz band. For future radio communication systems, for example the UMTS (Universal Mobile Telecommunication System) or other third-generation systems, frequencies within the frequency band of 2000 MHz are provided.

The transmitting station transmits essentially continuously, especially in the downward direction, that is to say in the direction from a base station to a mobile station, of a mobile radio communication system having a cellular structure. The data transmitted during the transmission are usually structured in frames which in each case have a predetermined length. The frames can also have a different structure and length, especially in the case of different services such as voice data transmission and video data transmission. However, the structure and/or length of each frame in a continuous sequence of frames is predetermined and/or is recognized by the receiving station. In each case, the boundary between two successive frames is unambiguously defined.

In communication systems in which transmission between a transmitting station and a receiving station is essentially continuous, the receiving station must also occasionally carry out other functions than data reception which cannot be carried out simultaneously, at least if only a single receiving device is operated. In particular, the mobile station in a mobile radio communication system having a cellular structure, in which the base stations of different cells transmit at different frequencies, must measure from time to time whether it is able to receive radio signals from another base station with a good quality of reception. For this purpose, the mobile station adjusts its receiving device to another frequency than the frequency at which it is currently receiving data. To be able to transmit from the base station to the mobile station without interruption, it has already been proposed to equip the mobile station with a second receiving device. In practice, however, this solution is rejected in most cases for reasons of cost.

Another proposal is known from the work of the Concept Group Alpha, which is occupied with working out a standard for future third-generation radio communication systems. In the document ETSI SMG II UMTS Ad Hoc, Tdoc SMGII UMPS 111/97, Helsinki, Finland, 17 to 21 Nov. 1997, Evaluation Document 2.0 (Evaluation Document in brief), Part 1: System Description, Performance Evaluation, Chapter 2.6.5 Hanover, it is known that the transmitting station interrupts the transmission at predetermined times in order to enable the receiving station to carry out an adjacent-channel search via its single receiving device. To avoid any loss of data, the base station (transmitting station) first transmits the data at a higher transmitting rate than at the essentially constant permanent transmitting rate. So that this will not lead to higher bit error rates (BER), the transmitting power must be additionally increased during this time. However, as the transmitting power increases, the interference effects are amplified, especially for other users of the communication system which leads to higher bit error rates there. Efforts are therefore being made to select the compression of the data and the increase in transmitting power to be as small as possible and, instead, to extend them over a relatively long period, for example over the transmitting period of a number of successive frames. During this process, the data which are transmitted at an increased transmission rate over the stretched period are coded jointly and are transmitted superimposed upon one another. As a result, the data from this so-called superposition period can only be decoded completely when all data of the superposition period have arrived at the receiving device. This entails corresponding delays which cannot be tolerated in all applications, especially not in voice transmission.

In the Evaluation Document, another possibility is described of how an interruption phase can be made possible by varying the transmission parameters. It is known to transmit the data redundantly with a redundancy factor, that is to say to transmit more bits in the digital data transmission than is absolutely necessary for coding the data. This makes it possible to ensure, in particular, an adequate transmission quality. It is proposed to lower the redundancy factor of the data which are transmitted before the interruption phase, wherein, as in the proposal described above, the data transmission rate of the frame immediately preceding the interruption phase and, respectively, the mean data transmission rate in the superposition period immediately preceding the interruption phase, are equal to the data transmission rate normally used. However, this proposal, too, leads to a poorer quality of reception and/or to greater delays in the decoding of the received data depending on the degree of reduction of the redundancy factor.

It is also known to interrupt the transmission of data during periodically recurring interruption phases. The frequency at which the interruption phases recur and the length of the interruption phases depend on the respective system and also on the respective operating state of the system. For example, interruption phases having in each case a length of 5 to 6 ms are sufficient for an adjacent-channel search by a mobile station in a radio communication system having a cellular structure. In systems having a hierarchic cell structure (HCS), it is sufficient to allow an interruption phase to occur approximately every 100 ms.

SUMMARY OF THE INVENTION

It is accordingly an object of the invention to provide a method for data transmission of the type mentioned initially which overcomes the above-mentioned disadvantageous of the prior art methods of this general type such that one or more interruption phases in the receiving station can take place and the received data can be evaluated with an acceptable delay while impairing the quality of the data transmission in the communication system as little as possible.

With the foregoing and other objects in view there is provided, in accordance with the invention a method for data transmission in a communication system, which comprises: using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function. The continuous interruption phase is configured to extend over at least a portion of a first frame and over at least a portion of a second frame that is successive to the first frame.

It is a central idea of the invention that an individual continuous interruption phase extends over at least sectional-portions of at least two successive frames. A section of a frame is understood to mean, among other things, a time interval of an interruption phase in which no data must be received, for example due to the compression of data which are received before and/or after the interruption phase.

The data received before and/or afterward are adequate for the quality required during the transmission. The time boundaries between the frames are unambiguously predetermined especially if the frames have a predetermined transmitting period for the actual data transmission and/or if in a sequence of frames, a sequence of transmitting time intervals allocated to the frames is predetermined. However, the invention is not restricted to communication systems in which the time boundary of successive frames is predetermined. For example, the end and/or the beginning of the data actually transmitted within a frame can be detected by means of a header information item and/or by means of special signaling bits.

An essential advantage of the invention lies in the fact that the sections or parts of the interruption phase can be kept short or, respectively, small in the individual frames so that the probability of a non-reception of redundantly transmitted data due to transmission breakdown is low.

In accordance with an added feature of the invention, the compression of data can be distributed to the time before and the time after the interruption phase. The compression factor is thus smaller than in the prior art, the interruption phase having the same length, for example, and it is possible to avoid a greater delay during the evaluation of data scrambled together, in spite of the fact that the compression is extended over a longer period.

The sections over which the interruption phase extends in the at least two successive frames are selected in dependence on the configuration and structure of the successive frames and depending on the required length of the interruption phase. The interruption phase preferably extends over the boundary between a first frame and a second frame, wherein data are received and/or processed in the first frame before the interruption phase and in the second frame after the interruption phase, that is to say the interruption phase in each case only extends over a sectional-portion of the first and of the second frame. In communication systems having a predetermined data transmission rate per frame, the interruption phase can thus be equal to or greater than the length of one frame overall but, nevertheless, it is only necessary to transmit the data of in each case one sectional-portion of the first and of the second frame before and, respectively, after the interruption phase compressed together with other data.

In accordance with an additional feature of the invention, the data are transmitted at an essentially constant permanent transmitting rate, wherein at least the data received immediately preceding and immediately following the interruption phase are in each case transmitted at a transmitting rate which is higher than the permanent transmitting rate. As an alternative or additionally, the data are transmitted redundantly with an essentially constant standard redundancy factor, wherein at least the data received immediately preceding and immediately following the interruption phase are in each case transmitted with a redundancy factor which is lower than the standard redundancy factor. The data received immediately preceding and immediately following the interruption phase are preferably in each case only transmitted within the boundaries of a single frame at the respective higher transmitting rate and/or with the respective lower redundancy factor, especially in voice data transmission.

In communication systems in which the data are coded jointly with data in each case to be transmitted before and/or afterward, over a superposition period having an essentially predetermined superposition length and are transmitted superimposed upon one another, the data received immediately preceding and immediately following the interruption phase are preferably in each case transmitted over less than one superposition length at the respective higher transmitting rate and/or with the respective lower redundancy factor. The superposition length can be less than, equal to or greater than the length of one frame.

In accordance with another feature of the invention, the data received immediately preceding and immediately following the interruption phase are transmitted at the same higher transmitting rate and/or with the same lower redundancy factor. The compression factor is thus the same before and after the interruption phase so that interference effects due to higher transmitting power can be largely restricted and/or avoided.

In accordance with a further feature of the invention, the interruption phase preferably extends over equally sized sectional-portions of the two successive frames, especially in communication systems in which the interruption phase is located in two successive frames of equal length.

Communication systems are known in which the receiving station interrupts the reception and/or processing of data during a plurality of interruption phases.

In accordance with a concomitant feature of the invention, the interruption phases can be distributed, for example, at constantly recurring time intervals in at least one higher-level multiframe which comprises a plurality of the individual frames for data transmission, and/or they can extend recurringly in each case at the same position of one of a number of multiframes which in each case comprise a predetermined number of the individual frames. In such systems, all these interruption phases are preferably interruption phases according to the invention which extend over at least sectional-portions of at least two successive frames.

Other features which are considered as characteristic for the invention are set forth in the appended claims.

Although the invention is illustrated and described herein as embodied in a data transmission with interruption phases, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
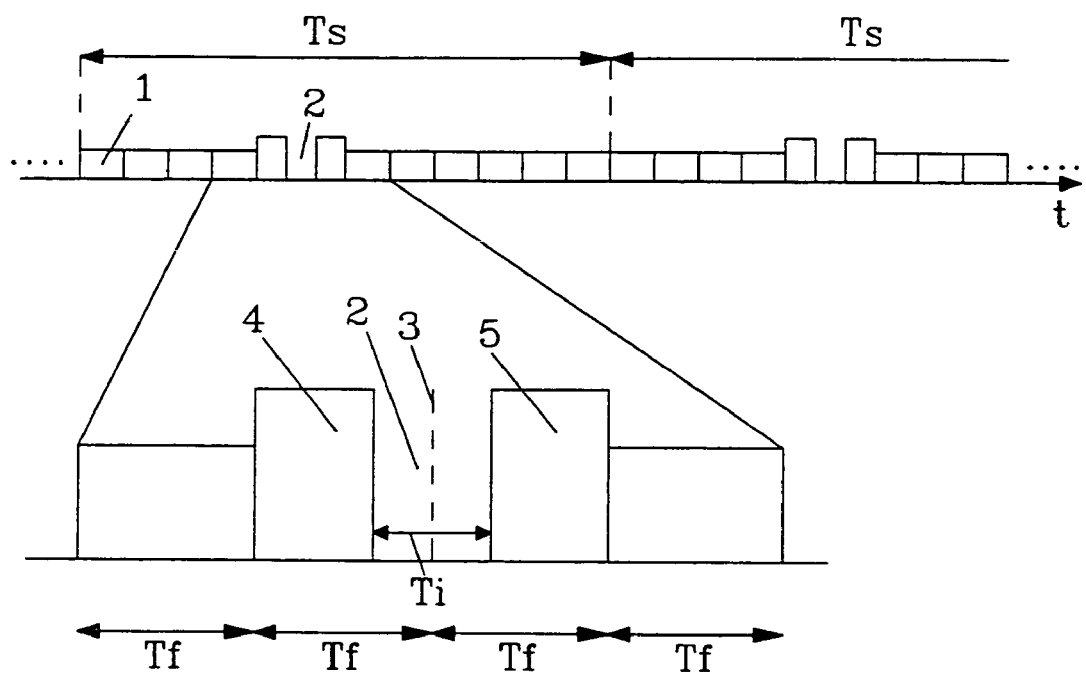
FIG. 1 shows a first illustrative embodiment of a frame structure having interruption phases during a transmission of a service with a low delay time.

Referring now to the figures of the drawing in detail and first, particularly, to FIG. 1 thereof, there is shown a frame structure of a service having a short delay time, especially of the voice transmission in a UMTS (Universal Mobile Telecommunication System) in which twelve individual frames 1 for data transmission are contained in each case within one multiframe. The individual frames 1 in each case have a transmission period Tf of 10 ms so that the multiframe has a transmitting period Ts of 120 ms overall. The fifth and the sixth individual frames 1 in each case exhibit a common interruption phase 2 which overlaps their frame boundary 3 and has a length Ti. The length Ti is, for example, 6 ms. The sectional-portions of the first frame 4, which begins before the interruption phase 2, and of the second frame 5, which ends after the interruption phase 2, are of equal length or, respectively, equal size.

In the illustrative embodiment shown in FIG. 1, voice data are transmitted so that a maximum delay of 10 ms, that is to say a frame length Tf, is acceptable during the evaluation of the data received by the receiving station. The data within a frame are in each case scrambled together, that is to say they are coded jointly and transmitted superimposed upon one another. In the illustrative embodiment, the transmitting rates of the first frame 4 and of the second frame 5 are in each case increased in such a manner that the same amount of information to be transmitted, which is transmitted over the frame length Tf in uncompressed frames 1 is transmitted within a period Tc=Tf−Ti/2. Compared with the prior art in which the total interruption phase is located within one frame, the increase in transmitting rate is thus much less, namely lower by a factor of 2. During the interruption phase 2 arriving or, respectively, occurring at the receiving station with less delay time, the receiving station interrupts the reception of data and conducts an adjacent-channel search via a receiving device by attempting to tune the receiving device to an adjacent channel.

Figure 2:
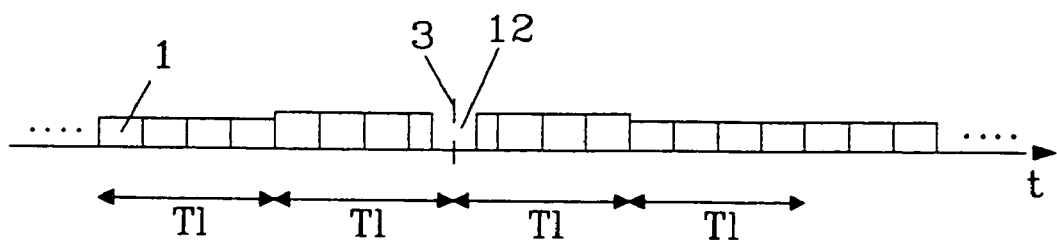
FIG. 2 shows a second illustrative embodiment of a frame structure having an interrupted data transmission in a service with a delay or, respectively, scrambling time which extends over a number of frames.

FIG. 2 shows the frame structure of a service comprising a delay time, or respectively, a scrambling time which extends over a number of frames. The individual successive frames 1 are combined in multiframes, not shown, comprising in each case a number of individual frames 1. The multiframes in each case have a transmitting length of 120 ms. In the illustrative embodiment shown in FIG. 2, the scrambling, or respectively, the superposition period extends over in each case four individual frames. In the optimum case, the scrambling can be floating, that is to say the data to be transmitted are coded jointly with the data in each case to be transmitted before and afterward, and are superimposed upon one another, in a floating manner. The discrete joining together of individual superposition periods of the superposition length Tl shown in FIG. 2 is thus to be understood only diagrammatically, in each case referred to the center, or respectively, the end of the superposition periods. The diagrammatic representation is only used for explaining the data compression which is necessary due to the interruption phase 12.

The interruption phase 12 extends over the boundary 3 between two individual frames. The data to be transmitted are transmitted redundantly with an essentially constant standard redundancy factor. To be able to keep the transmission rate of the data constant averaged over time even in the area of the interruption phase 12 over the superposition lengths Tl shown, the data are transmitted with a lower redundancy factor in each case over a superposition period of length Tl before and after the boundary 3. In this arrangement, the height of the frames shown corresponds approximately to the instantaneous transmission rate as also in FIG. 1. In this manner, the interruption phase 12 can be used, for example, for detecting an FCCH (Frequency Correction Channel) and an SCH (Synchronization Channel) of an adjacent transmitting station according to the GSM (Global System for Mobile Communication) standard or for synchronization to an adjacent channel in a UMTS. The length of the interruption phase 12 is, for example, 5 ms.

I claim:

1. A method for data transmission in a communication system, which comprises:
    using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;
    configuring the continuous interruption phase to extend over at least a portion of a first frame and over at least a portion of a second frame that is successive to the first frame;
    transmitting the data at a substantially constant permanent transmission rate, except for the data that are received immediately preceding and immediately following the continuous interruption phase;
    transmitting the data that are to be received immediately preceding the continuous interruption phase at a transmission rate that is higher than the substantially constant permanent transmission rate; and
    transmitting the data that are to be received immediately following the continuous interruption phase at a transmission rate that is higher than the substantially constant permanent transmission rate.

2. The method according to claim 1, which comprises configuring the continuous interruption phase to extend over a boundary between the first frame and the second frame, and transmitting data in the first frame and the second frame, and transmitting data in the first frame before the interruption phase and transmitting data in the second frame after the interruption phase.

3. The method according to claim 1, which comprises:
transmitting the data that are to be received immediately preceding the continuous interruption phase within boundaries of the first frame; and
transmitting the data that are to be received immediately following the continuous interruption phase within boundaries of the second frame.

4. The method according to claim 1, which comprises:
coding the data jointly, in each case, with data to be transmitted before and/or afterward over a superposition period having an essentially predetermined superposition length and transmitting the data superimposed upon one another;
transmitting the data to be received immediately preceding the continuous interruption phase over less than one superposition length at the higher transmission rate; and
transmitting the data to be received immediately following the continuous interruption phase over less than one superposition length at the higher transmission rate.

5. The method according to claim 1, which comprises:
transmitting the data that are to be received immediately preceding the continuous interruption phase at the same transmission rate as the data that are to be received immediately following the continuous interruption phase.

6. A method for data transmission in a communication system, which comprises:
using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;
configuring the continuous interruption phase to extend over at least a portion of a first frame and over at least a portion of a second frame that is successive to the first frame;
transmitting the data redundantly with a substantially constant standard redundancy factor, except for the data that are received immediately preceding and immediately following the continuous interruption phase;
transmitting the data that are to be received immediately preceding the continuous interruption phase with a redundancy factor that is lower than the standard redundancy factor; and
transmitting the data that are to be received immediately following the continuous interruption phase with a redundancy factor that is lower than the standard redundancy factor.

7. The method according to claim 6, which comprises:
transmitting the data that are to be received immediately preceding the continuous interruption phase within boundaries of the first frame; and
transmitting the data that are to be received immediately following the continuous interruption phase within boundaries of the second frame.

8. The method according to claim 6, which comprises:
coding the data jointly, in each case, with data to be transmitted before and/or afterward over a superposition period having an essentially predetermined superposition length and transmitting the data superimposed upon one another;
transmitting the data to be received immediately following the continuous interruption phase over less than one superposition length at the higher transmission rate.

9. The method according to claim 6, which comprises:
transmitting the data that are to be received immediately preceding and immediately following the continuous interruption phase with same redundancy factor.

10. A method for data transmission in a communication system, which comprises:
using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;
configuring the continuous interruption phase to extend over at least a portion of a first frame and over at least a portion of a second frame that is successive to the first frame.

11. A method for data transmission in a communication system, which comprises:
using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;
configuring the continuous interruption phase to extend over at least a portion of a first frame and over at least a portion of a second frame that is successive to the first frame;
distributing a plurality of continuous interruption phases in constantly recurring time intervals in at least one higher-level multiframe that includes a plurality of frames; and
using the receiving station to interrupt performing an operation selected from the group consisting of receiving the transmitted data and processing the transmitted data during the plurality of continuous interruption phases.

12. A method for data transmission in a communication system, which comprises:
using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;
configuring the continuous interruption phase to extend over at least a portion of a first frame and over at least a portion of a second frame that is successive to the first frame;
configuring a plurality of multiframes such that each of the multiframes includes a predetermined number of frames;
configuring a plurality of continuous interruption phases such that an interruption phase extends recurringly in a given position of one of the plurality of multiframes; and
using the receiving station to interrupt performing an operation selected from the group consisting of receiving the transmitted data and processing the transmitted data during the plurality of continuous interruption phases.

13. A method for data transmission in a communication system, which comprises:

using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;

configuring the continuous interruption phase to extend over at least a portion of a first frame and over at least a portion of a second frame that is successive to the first frame using the transmitting station to transmit the data such that no data transmitted thereby arrive at the receiving station during the continuous interruption phase.

14. The method according to claim 1, wherein the other function performed by the receiving station includes carrying out a measurement with a receiving device.

15. The method according to claim 1, which comprises providing the transmitting station and the receiving station as components of a CDMA mobile radio system.

16. A method for data transmission in a communication system, which comprises:

using a transmitting station to transmit data in structured frames in a manner such that, in at least one continuous interruption phase, a receiving station receiving the transmitted data can interrupt performing an operation selected from the group consisting of receiving the transmitted data and processing the transmitted data and can perform at least one other function;

configuring the continuous interruption phase to extend over at least a portion of a first frame and over at least a portion of a second frame that is successive to the first frame;

constructing the receiving station to receive the transmitted data; and constructing the receiving station such that during the continuous interruption phase, the receiving station can interrupt performing an operation selected from the group consisting of receiving the transmitted data and processing the transmitted data.

17. The method according to claim 1, which using a base station of a mobile radio system as the transmitting station.

18. A method for data transmission in a CDMA mobile radio system, which comprises:

using a transmitting station of the CDMA mobile radio system to transmit data in structured frames in a manner such that, in at least one continuous interruption phase, a receiving station of the CDMA mobile radio system receiving the transmitted data can interrupt performing an operation selected from the group consisting of receiving the transmitted data and processing the transmitted data and can perform at least one other function; and configuring the continuous interruption phase to extend over at least a portion of a first frame and over at least a portion of a second frame that is successive to the first frame.

19. A method for data transmission in a mobile radio system, which comprises:

using a base station of the mobile radio system to transmit data in structured frames in a manner such that, in at least one continuous interruption phase, a receiving station in the mobile radio system receiving the transmitted data can interrupt performing an operation selected from the group consisting of receiving the transmitted data and processing the transmitted data and can perform at least one other function; and configuring the continuous interruption phase to extend over at least a portion of a first frame and over at least a portion of a second frame that is successive to the first frame.

* * * * *